United States Patent [19]

Gubin

[11] Patent Number: 4,736,702
[45] Date of Patent: Apr. 12, 1988

[54] WATERCRAFT

[76] Inventor: Daniel Gubin, P.O. Box 159, Coosada, Ala. 36020

[21] Appl. No.: 937,056

[22] Filed: Dec. 2, 1986

[51] Int. Cl.⁴ .............................................. B63C 13/00
[52] U.S. Cl. ...................................................... 114/353
[58] Field of Search ................ 114/270, 344, 353, 29, 114/352; 280/414.2, 414.1; 440/11; 180/198

[56] References Cited

U.S. PATENT DOCUMENTS

| | | | |
|---|---|---|---|
| 2,588,084 | 3/1952 | Bushfield | 114/344 |
| 2,855,209 | 10/1958 | Hull | 114/344 |
| 3,067,439 | 12/1962 | Brush | 440/11 |
| 3,193,851 | 7/1965 | Fiebelkorn | 114/344 |
| 3,289,225 | 12/1966 | Isch et al. | 114/344 |
| 3,335,437 | 8/1967 | Judkins | 114/344 |
| 3,738,684 | 6/1973 | Lusk | 114/344 |
| 3,763,511 | 10/1973 | Sisil | 114/344 |
| 3,877,094 | 4/1975 | Kelly | 114/344 |

Primary Examiner—Sherman D. Basinger
Assistant Examiner—Edwin L. Swinehart

[57] ABSTRACT

A combination trailer and pontoon boat is disclosed in which the supporting wheels are attached to the boat by a confining track. This provides for the controlled launching and landing of the boat while the supporting wheels are fixed in place on dry land. Ramps permit the loading of the towing vehicle onto the boat while both are on dry land. A towing structure moves beneath the boat during loading and off-loading of the tow vehicle and is then pivoted upward in the waterborne mode. The supporting wheels are winched from their position beneath the boat rearward and upward along the confining track in the waterborne mode. The combination trailer and pontoon boat is a towable, one vehicle ferry.

4 Claims, 3 Drawing Sheets

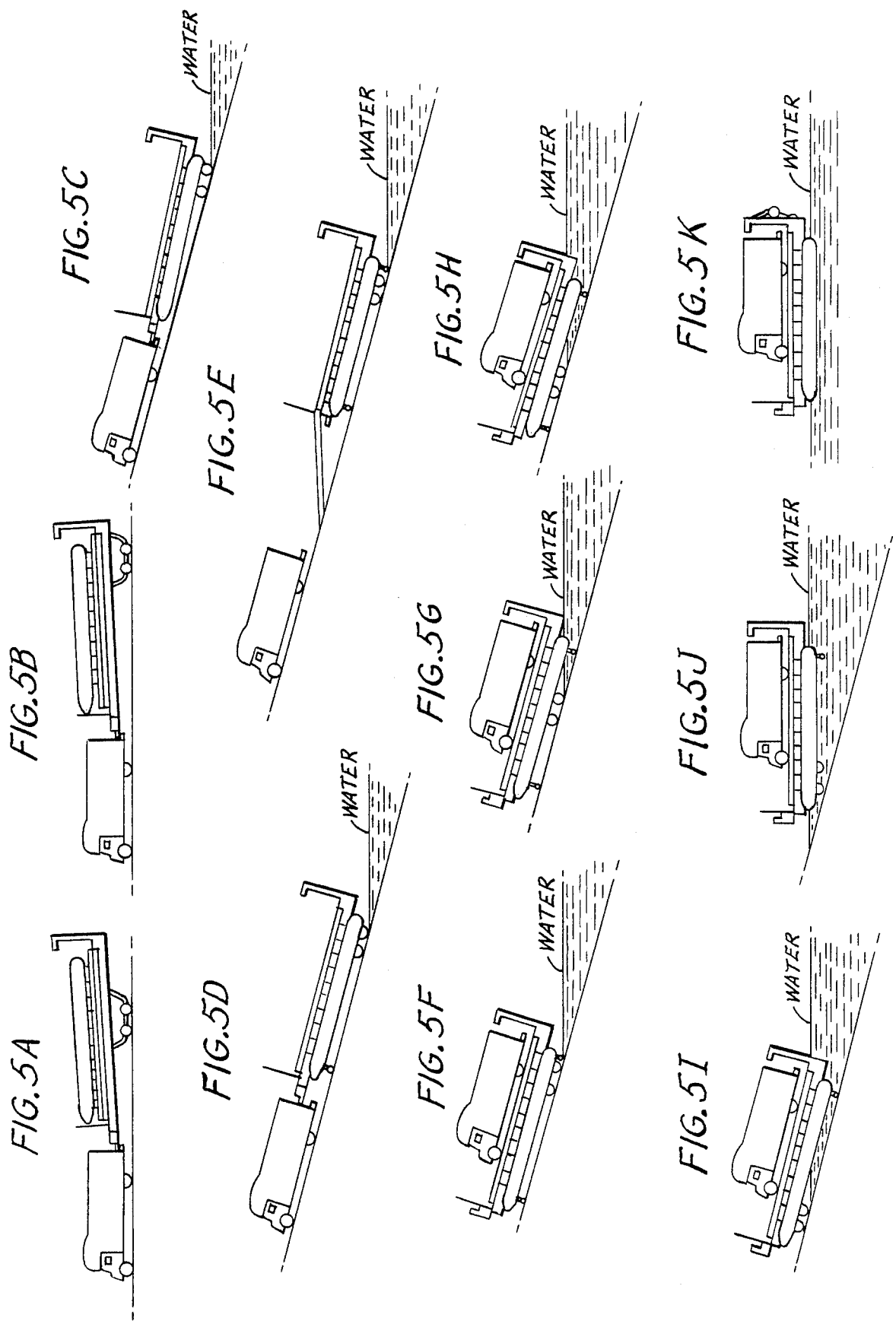

WATERCRAFT

TECHNICAL FIELD

The description refers to a watercraft with unique features that permit land vehicles to tow it and then launch themselves on top of it. The craft is a one vehicle ferry. The uses include permitting recreational vehicles to become houseboats and military vehicles to cross or patrol bodies of water without benefit of bridge or naval units. The features include:

(1) A wheeled mechanism to permit towage behind a vehicle.

(2) A track along which the wheeled mechanism can move to permit launching and landing.

(3) A ramp to permit the vehicle to mount the ferry.

(4) A winch mechanism to permit the wheeled mechanism to be moved out of the water.

(5) A hinge mechanism to permit towing along roads when folded and to provide for an adequate beam and stability when afloat in the unfolded position.

BACKGROUND OF THE INVENTION

There are many types of watercraft. Some craft, ferries, are designed to carry vehicles. Few if any ferries are designed to be towed along roads within common road width clearances of seven and one half or eight feet. Ferries frequently have a ramp mechanism to provide for the loading and off-loading of the vehicular cargo. Few if any provide for the loading and off-loading while the ferry is on dry land. Many watercraft may be towed on a trailering device to a point of launching. Some may make the trailering device an integral part of the craft itself. Few if any provide for an integral trailering device to be moved out of the water once the craft is launched. Many craft must be pushed into the water from the loading ramp by a force external to the craft. Few if any craft provide for the launching force to be provided from within the craft.

BRIEF DESCRIPTION OF THE INVENTION

The present invention employs several novel features to provide a one vehicle ferry with the features of towability, loading of the towing vehicle, and launching of the craft without the aid of an outside force. Such a craft turns a land vehicle into an amphibious machine. It permits travelling one way on a river and driving back to the starting point on roads. The craft is provided with wheels mounted on axles. The axles are mounted on a device akin to a truck on a rail car. With the truck locked in place, the truck and the wheels provide a method of towing the overlying craft. The truck as a whole is mounted on rollers which run in a confining track. A winch is mounted at the stern end of the track and provides a method for moving the truck to different positions. The different placements of the truck as will be described below provide for the different functions, namely, loading, launching, water transport, landing, off-loading, and towing. In addition, the craft is hinged longitudinally in two places so that when folded the craft meets road limitations either legal or practical. When unfolded at launching, the beam of the craft approaches twice the road limitations. This provides for stability when afloat.

It is an object of the invention to provide a ferry boat which is towed by the vehicle that will ride upon the ferry.

Another object of the invention is to provide a ferry boat which may be launched from a ramp without the aid of forces external to the ferry.

A further object of the invention is to provide a ferry boat which may power itself out of the water without the aid of forces external to the ferry.

Another object of the invention is to provide a broad beamed watercraft that may navigate narrow roads when towed ashore.

To attain these and other objects, the present invention provides a pontoon watercraft which employs a novel system of movable wheels and folding deck structure. During towing on land, the truck should be locked slightly to the rear of the center of gravity so that there is enough weight on the tow bar to keep the socket firmly upon the ball on the rear of the towing vehicle. The wheels are free to rotate upon their axles and the craft is in the folded position. Upon reaching the launching ramp, the truck is moved to the rear of the craft, and the craft is backed to the water's edge. The wheels are locked. The craft is unfolded and the deck is locked in the unfolded position. The front support wheels are lowered, thus raising the craft off the towing vehicle. The towing vehicle is driven forward a short distance. The loading ramp is extended to the ground and the rear wheels are lowered. The vehicle backs up the ramp onto the craft. It is held fast to the craft by chain or cable and turnbuckle. The loading ramp is replaced in the craft. To launch the craft, the wheels remain locked, but the truck is unlocked. If the launching ramp is at a steep incline relative to the water, the craft will slide down the incline over the truck that is stationary relative to the ramp. At some point the buoyancy of the pontoons will lift the entire vessel including the truck and its wheels off the ground. The vessel would then be afloat on the water. If the launching ramp is not steep, the winch supported at the rear of the rails and attached to the truck is employed. By pulley placement in the front of the craft, the winch can cause the truck to move either forward or rearward relative to the craft when the truck is in the unlocked position as it is at time of launch. Since the wheels and hence the truck are fixed in position relative to the ground, the action of the winch would be to pull the craft over the truck that is fixed relative to the ground but unfixed relative to the craft. (The cable between the forward pulley and the truck would be in tension). This will launch the craft in fashion similar to that described above. Once afloat, the truck is winched out of the water along the track that curves up the stern. The lateral support wheels are raised. The motor may be either twin outboards or an inboard. If outboards, they may be mounted on a swivel mount on the folding section of the craft. The swivel mount would permit upright positioning in the folded towing mode. If an inboard is mounted on the central section of the craft, a means of moving its shaft out of the way of the truck must be provided. To land the craft, the support wheels are lowered and the truck is winched to the farthest forward position. The craft is then run into the sloped bank. When it stops, the wheels are locked, but the truck is left free to move along the track. The craft is winched over the fixed wheels onto the ramp. (The cable between the rear winch and the truck is in tension). The truck is then locked in position and the loading ramp extended. The vehicle drives off, and the loading ramp is replaced. The rear wheels are raised, and the craft is folded. The vehicle backs up under the tow socket, and the front support wheels are raised thus lowering the craft upon the tow ball. The wheels are unlocked and the truck is locked. The vehicle drives away from the water's edge. The truck is unlocked, and the wheels are locked. The vehicle backs up until the truck is in the correct tow position. The truck is locked, the wheels unlocked, and the vehicle and craft are ready for land travel.

BRIEF DESCRIPTION OF THE DRAWINGS

FIG. 5 shows the launch procedure.

DETAILED DESCRIPTION

Figure 1:
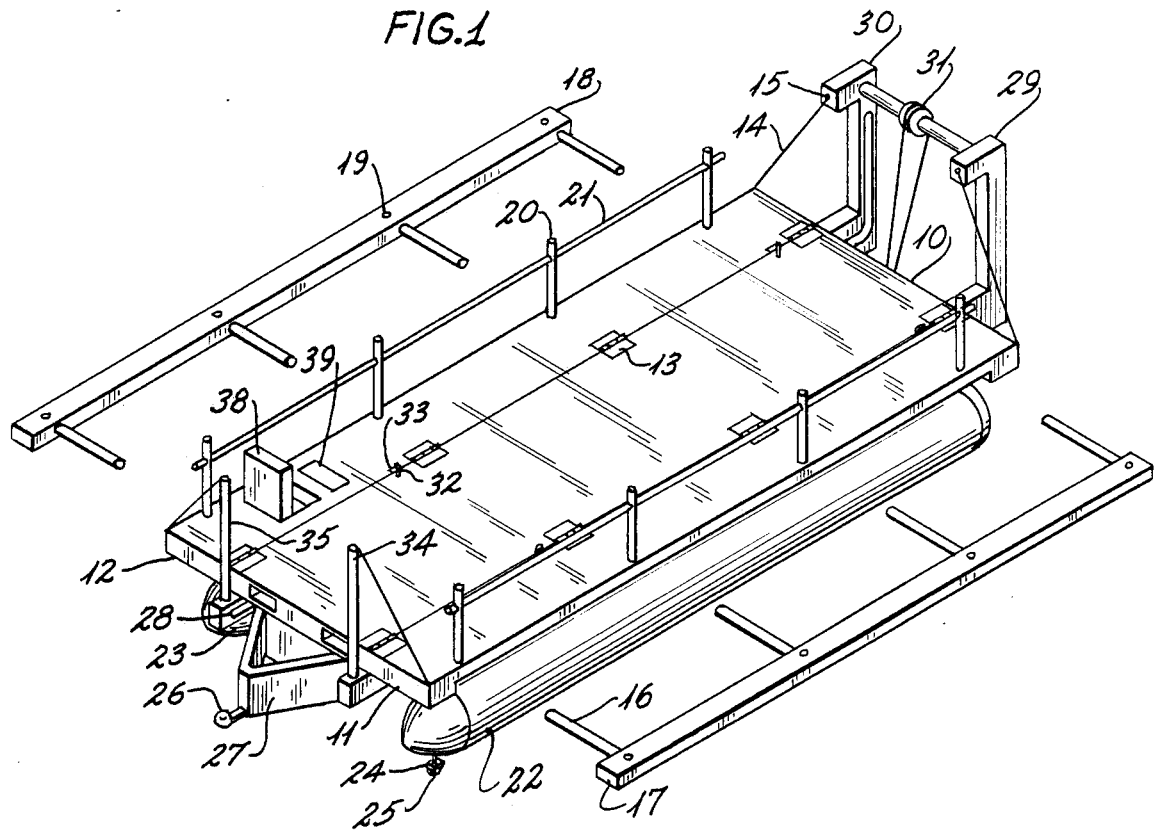
FIG. 1 is an oblique view from above and forward of the craft in the unfolded position.

The craft in the unfolded position is shown in FIG. 1. The main deck 10 is flanked by left folding deck 11 and right folding deck 12. Hinges such as 13 serve to connect the folding decks 11 and 12 to the main deck. In the folded position, the folding decks 11 and 12 are upside down with their upper surfaces facing downward atop the main deck 10. Cables such as 14 are attached to each outboard edge of the folding decks 11 and 12 and are attached at their other end to winches such as 15. The winches such as 15 are used for raising and lowering the folding deck sections 11 and 12. The winches such as 15 are mounted upon a swivel so that they may be moved passed dead center when the folding decks 11 and 12 are passing the vertical position. When the decks are in the unfolded position as drawn in FIG. 1, they are locked in place by locking pins such as 16 attached to the left deck lock bar 17 and the right deck lock bar 18. The locking pins such as 16 fit into cylindrical chambers in the structural frame of main deck 10. The deck lock bars 17 and 18 are provided with holes such as 19 to receive side rail supports such as 20. The side rail supports such as 20 serve both to provide support for the side rails such as 21 and to lock the deck lock bars 17 and 18 into place. The side rail supports can be provided with a simple locking mechanism to prevent inadvertant raising of the rails. Only the locking pins such as 16 actually transfer the load from main deck 10 to folding decks 11 and 12.

Left pontoon 22 and right pontoon 23 are firmly attached to the underside of folding decks 11 and 12 respectively. The pontoons provide buoyancy for the entire craft. When in the folded position, the pontoons 22 and 23 are upside down atop the folded decks. A retractable wheel mechanism such as 24 at the front and rear of the pontoons is provided a means for lowering pontoon wheels (left front wheel 25 shown) during launching and landing, and for raising pontoon wheels out of the way into the pontoons during towing and during periods afloat.

Tow socket 26 is attached to tow structure 27 to permit towing behind a vehicle on land. The tow structure 27 has three positions. The towing position is drawn in FIG. 1. Additionally, the tow structure is mounted on axles which carry rollers which run in tracks afixed beneath each edge of the main deck 10. The "C" shaped track 28 is visible in FIG. 1 in its furtherest forward projection beneath the right edge of the main deck 10. The rear most extention of track 28 is visible extending over the stern of the craft and is labelled 28a. During towing, the tow structure 27 is locked in place relative to track 28 by means of pins or other locking device. When the tow vehicle is to mount the craft, the tow structure 27 is unlocked and moved along the tracks until it is sufficiently out of the way beneath main deck 10. After the vehicle has mounted aboard the craft, the tow structure 27 is brought to the extreme forward position and pivoted upward on its support axle. This provides for tow structure 27 to be out of the water when the craft is launched and for protection of tow socket 26 from damage. Water resistance is diminished since tow structure 27 would not be in the water. Finally, in the upright position, tow structure 27 provides protection to those on the craft from accidentally falling off the craft forward.

Rear tower supports 29 and 30 serve as a continuation of the tracks to the rear of the craft and upward. The rear tower supports 29 and 30 also serve to support the truck winch 31 and the winches and swivels for the folding decks. The operations of the rear extentions of the tracks and the operation of the truck winch 31 will be described below.

Four hooks such as 32 are placed strategically at the left and right edges of main deck 10. These hooks receive the cables and turnbuckles that serve to hold the vehicle fast to the deck. Four cutouts such as 33 in the folding decks 11 and 12 provide the recess needed for hooks like 32 when the craft is folded in the towing position. The cutouts such as 33 may be provided with covers to prevent accidental injury. The front tower supports 34 and 35 support the winches and swivels for the folding decks. In addition, they may be provided with hooks to serve to tie down a canopy that extends from the front of the mounted vehicle. Ramp slots 36 and 37 provide recessed storage for the ramps used to load and unload the vehicle. When pulled forward to their furtherest extention, the ramps are free to swivel downward to engage the ground. Control panel 38 is unfolded from its storage position in folding deck 12. It provides a place for craft and motor controls. Seat 39, seen here in the folded position pops up for use when control panel 38 is operational.

Figure 2:
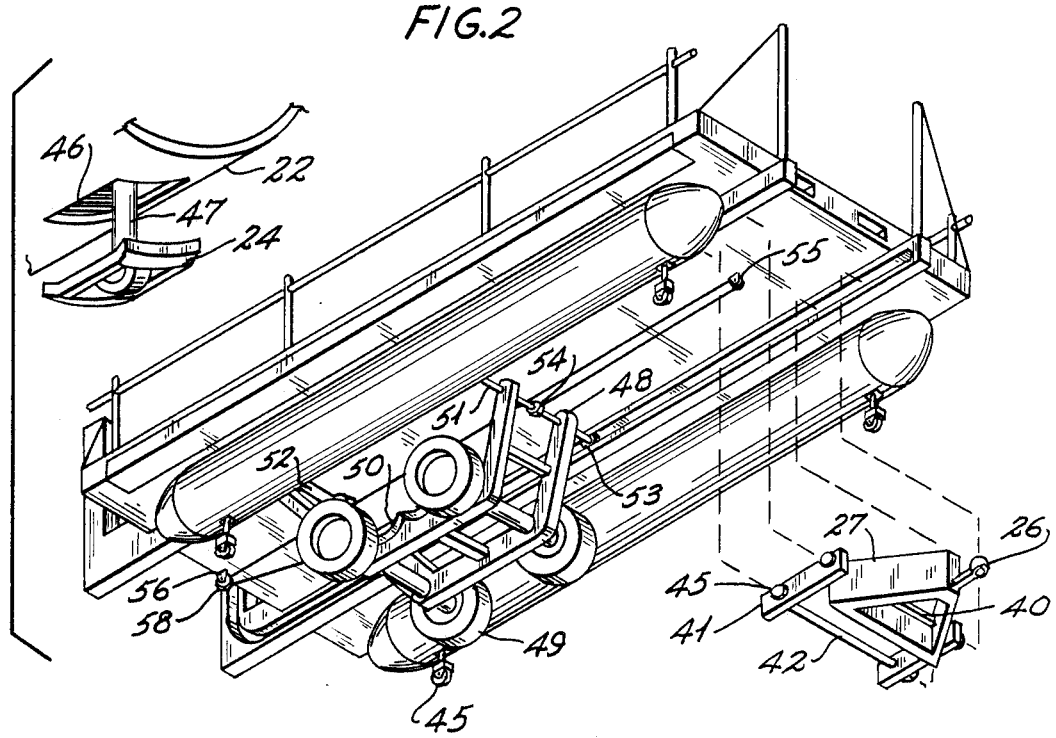
FIG. 2 is an oblique view from below and forward of the craft in the unfolded position.

FIG. 2 shows the craft from below with the tow structure 27 removed to the lower right corner of the drawing for clarity. Tow structure 27 is free to swivel about axle 40 of tow frame 41. Axle 42 and axle 40 carry roller wheels such as 43 that run in track 44 and 28. This arrangement permits the three positions described above for tow structure 27 and the attached tow socket 26. Rear wheel 45 as well as all other pontoon wheels are visible in this view. The enlargement of a pontoon wheel is drawn in the upper left corner. Internal division 46 is provided to maintain watertight integrity to the entire pontoon independent of the position of the wheel mechanism. Piston 47 raises pontoon wheel mechanism 24 flush with pontoon 22 and serves to lower pontoon wheel mechanism 24 towards the ground. The wheel mechanism is provided with ski like framework to prevent the wheel from digging into underwater mud.

The truck 48 carries the tow wheels such as 49 mounted on springs such as 50. Two additional axles 51 and 52 pass through the truck and are afixed to roller wheels such as 53 that ride in tracks 44 and 28. The tow wheels such as 49 and the track wheels such as 53 are provided braking mechanisms, one for the tow wheels and one for the track wheels. The track wheels or their axles need not carry brakes if the tracks themselves are provided with a mean of locking the truck in place, such as by means of a pressure plate or locking pins. The brake controls may be run by cable to the upper side of the craft. Axles 51 and 52 further carry hook mechanisms such as 54 that are free to rotate about the axles. The front hook 54 is attached by chain or cable around pulley 55 around pulley 56 and thence to truck winch 31. Rear hook mechanism 57 (on FIG. 3) is attached similarly via pulley 58 to winch 31. The chain labelled 59 from front hook mechanism 54 around pulleys 55 and 56 to winch 31 may continue to pulley 58 to rear hook mechanism 57. The action of the truck winch will either tend to pull the truck forward or rearward relative to the tracks 44 and 28 and hence relative to the entire craft. If the tow wheels such as 49 are locked and fixed relative to the ground, then the action of winch 31 will be to pull itself and hence the entire craft over the fixed (relative to the ground) truck 48. It is this action which serves to launch and land the craft.

Figure 3:
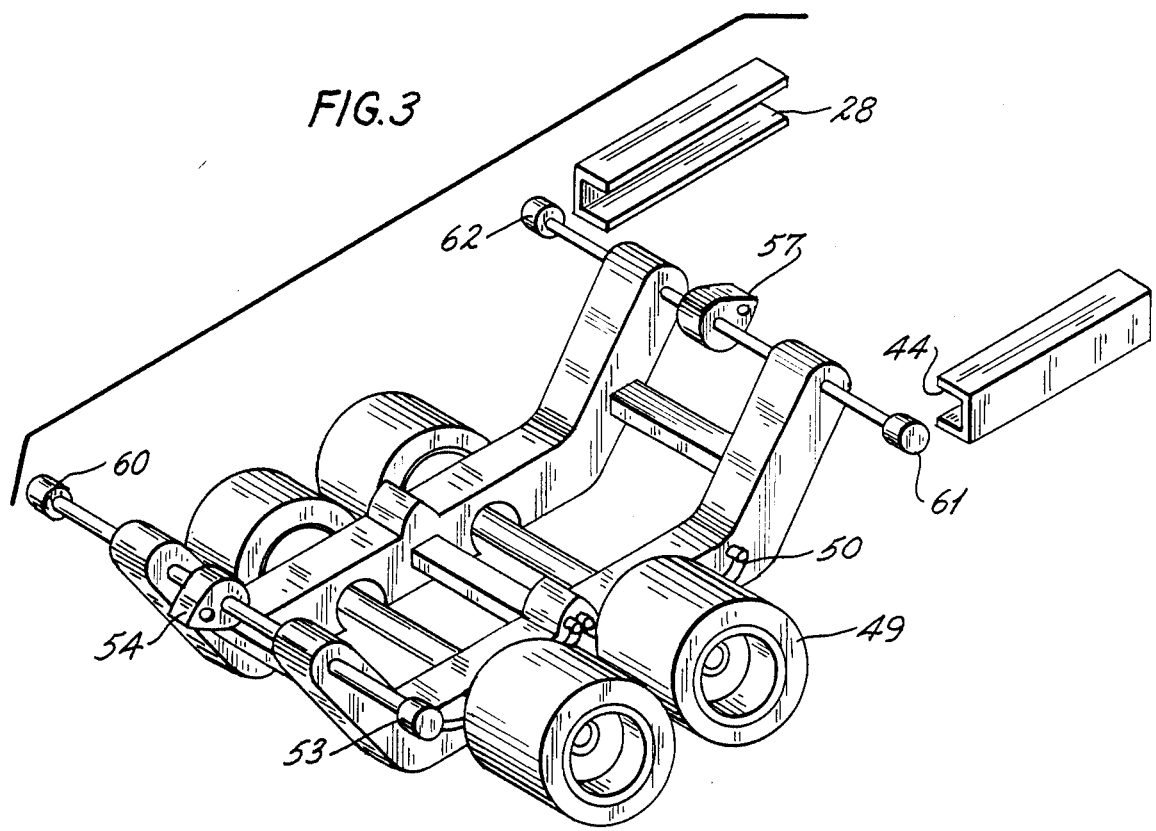
FIG. 3 is an oblique view of the truck.

FIG. 3 shows the truck in an upright position. The rear hook mechanism 57 is now visible as are the four track wheels 53, 60, 61, and 62. The relative placement of tracks 44 and 28 are shown.

Figure 4:
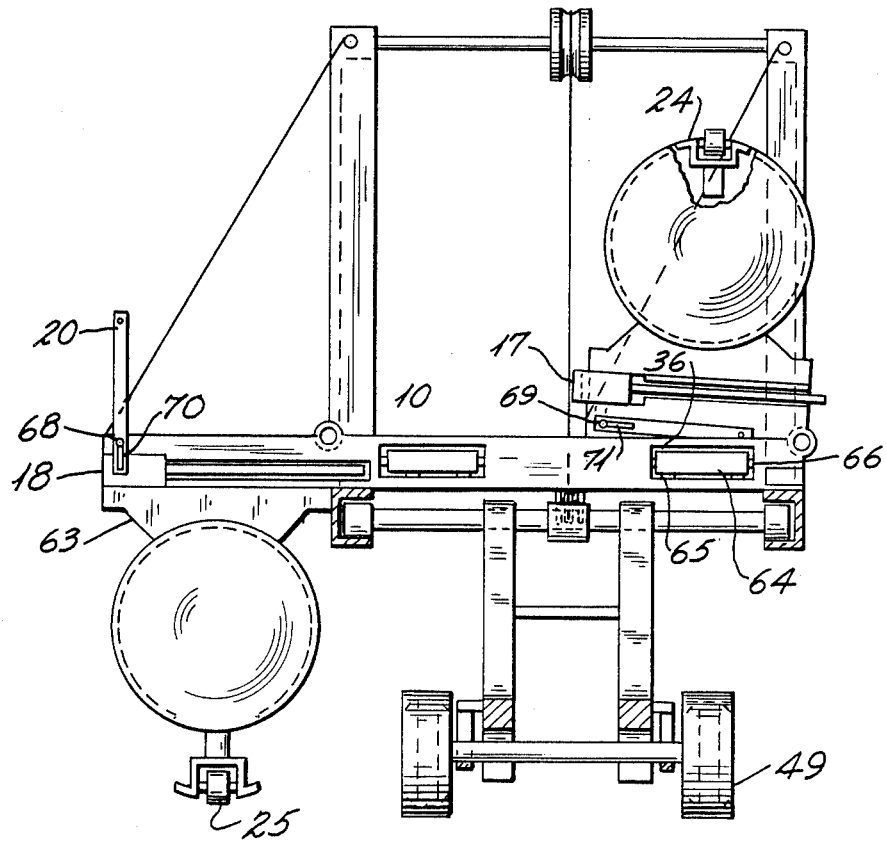
FIG. 4 shows a cross section of the craft in the partially unfolded position.

FIG. 4 is a cross-section through the craft with the left side unfolded and the right side folded. Visible in this view is pontoon supports 63 which serve to attach the pontoons to the folding decks. The pontoon wheels such as 25 are shown extended on the left. Normally they are not extended fully to assure that most weight remains on the tow wheels. The right pontoon shows the pontoon wheel mechanism 24 in the fully retracted position. Only a portion of the wheel extends beyond the pontoon. This provides some protection to the bottom of the pontoon but minimizes the water resistance.

Ramp 64 is visible inside of ramp slot 36. Rollers 65 provide for ease of movement of the ramp in its slot. Pivot pin 66 provides for pivoting the ramp to the ground when in the fully extended position. Hinge 13 is visible as are deck lock bars 17 and 18. Locking pin 16 is set all the way into the receptacle 67 in the main deck 10. Deck lock bar 18 can be seen to be locked in place by side rail support 20. Pins 68 and 69 are provided in folding decks 12 and 11 to permit the raising and lowering of side rail supports. They also provide for the rail supports to pivot flat when in the folded position, yet without permitting their removal. Slots 70 and 71 cut in support 20 allow this action. On the right, the same mechanisms are shown in the unlocked and folded position.

FIG. 5 shows the craft in various modes. In part A, the craft is folded and being towed by a recreational vehicle. Upon reaching the launch area, track wheels are unlocked and the tow wheels are locked and the recreational vehicle is driven forward a short distance. This brings the craft forward over the stationary truck as shown in part B. The track wheels are locked in place and the tow wheels are unlocked and the recreational vehicle is backed up down the launching ramp to the water's edge. The tow wheels are now locked again. If the slope of the ramp is shallow rather than steep as drawn, the craft may have to be backed up into the water, but not so far as to provide for buoyancy. The craft is unfolded as shown in part C. The front pontoon wheels are lowered lifting the tow socket off the recreational vehicle's tow ball as shown in part D. The vehicle drives forward. The rear pontoon wheels are lowered, the tow structure is pushed along the tracks under the craft and the loading ramps are extended and pivoted until they reach the launching ramp as shown in part E. The recreational vehicle drives up the loading ramps onto the craft and held fast by means of turnbuckles. The tow structure is brought forward and pivoted upward as shown in part F. The track wheels are unlocked and the craft slides down the launching ramp over the truck. If the craft does not slide down by gravity, the truck winch may be used. A mid position is illustrated in part G. The process continues in parts H and I until the buoyancy of the pontoons lifts the craft off the bottom as shown in part J. Finally the pontoon wheels are raised and the truck is winched out of the water and the craft is afloat as shown in part K. Landing essentially reverses the steps.

I claim:

1. A combination trailer and pontoon boat comprising:
   (a) a central deck for supporting a tow vehicle,
   (b) two lateral decks attached by hinged means to the central deck,
   (c) pontoons attached to the lateral decks,
   (d) ramp means for loading said tow vehicle onto the central deck,
   (e) a tow means for attaching the combination trailer and pontoon boat to said tow vehicle,
   (f) extendable pontoon wheels for lifting the tow means off said tow vehicle,
   (g) a locking means for fixing the lateral decks in position relative to the central deck,
   (h) lateral deck rails for pinning the locking means in place,
   (i) wheeled means for suporting the weight of the combination trailer and pontoon boat when on land,
   (j) a confining track for attaching the wheeled means to the central deck,
   (k) a winch and pulley means for altering the position of the wheeled means along the confining track.

2. The apparatus of claim 1 wherein the confining track is extended rearward and curved upward providing for the wheeled means to be raised above the water surface.

3. The apparatus of claim 1 wherein the tow means is attached to the central deck by the confining track used to attach the wheeled means providing for the movement of the tow means beneath the central deck.

4. The apparatus of claim 1 wherein the tow means is provided with a pivot means for raising the tow means above the water surface.

* * * * *